Patented Dec. 3, 1946

2,411,954

UNITED STATES PATENT OFFICE 2,411,954

TREATMENT OF POLYUNSATURATED ESTERS WITH POLYTHIOLS AND PRODUCTS PRODUCED THEREBY

William James Burke, Marshallton, Del., assignor to E. I. du Pont de Nemours & Company, Wilmington, Del., a corporation of Delaware No Drawing. Application January 25, 1944, Serial No. 519,689

15 Claims. (Cl. 260—225)

This invention relates to new compositions of matter and to methods for their preparation.

An object of this invention is to provide potentially reactive compositions comprising blends of organic solvent soluble polyunsaturated polymeric organic materials and monomeric polythiols. A further object is to provide new compositions capable of being rendered insoluble in organic solvents upon exposure to an oxygen-containing atmosphere. A still further object is to provide compositions useful in the coating arts. Another object is to provide methods for preparing said compositions. Other objects will appear hereinafter.

These objects are accomplished by the following invention wherein an organic solvent soluble polymeric organic material having a plurality of ethylenic linkages, i. e., acyclic double bonds, is brought into contact with a monomeric organic compound having a plurality of thiol groups and the mixture is then exposed to an oxygen-containing atmosphere.

The more detailed practice of the invention is illustrated by the following examples wherein parts are by weight, color in Gardner-Holdt scale units, and viscosity in poises. There are, of course, many other forms of the invention other than these specific embodiments.

Example I

Cellulose acetate methacrylate is prepared by heating a mixture of 300 parts of plastics grade cellulose acetate, 340 parts of pyridine, 680 parts of acetone, 680 parts of toluene, and 95 parts of methacrylic anhydride at 76° C. to 78° C. for 22 hours, followed by precipitation with ethyl alcohol and washing overnight with fresh ethyl alcohol. The washing treatment is repeated with ethyl alcohol and the precipitate is then washed for two days with water. Upon drying in a steam heated air circulating oven, there is obtained 220 parts of cellulose acetate methacrylate.

To three parts of the cellulose acetate methacrylate prepared as above is added 0.3 part of 2-methylpentanedithiol-2,4 in 21.5 parts of acetone and the mixture is agitated until it is clear. A thin film of the resulting solution dries to a coherent film on exposure to air. On heating at 150° C. in air for 15 hours the film becomes completely insoluble in acetone.

Films prepared from a mixture consisting of three parts of cellulose acetate methacrylate and 0.3 part of 2-ethyl-hexanedithiol-1,3 are rendered completely insoluble in acetone after only 2 hours heating at 150° C. in air.

Example II

Ethylene glycol maleate is prepared by reacting a mixture of 175 parts of ethylene glycol and 277 parts of maleic anhydride in a reactor fitted with a stirrer, a thermometer, a gas inlet tube for inert gas, and a condenser fitted with a take-off for removal of water and return of solvent to the reaction mixture. The mixture is brought to 80° C., 25 parts of xylene added, and the temperature raised to 130° C., whereupon vigorous refluxing occurs. The temperature is raised slowly to 200° C. in about one hour, during which time 52 parts of water is obtained and the reaction continued at 200° C. for about 4.5 hours. The resinous reaction product, amounting to 115 parts, is dissolved in a mixture of 170 parts of methyl ethyl ketone and 166 parts of methylene chloride and strained through a fine filter. A thin film of this material is still tacky and is soluble in methylene chloride even after heating for one hour at 100° C. in air.

A mixture consisting of 200 parts of the above ethylene glycol maleate resin solution and ten parts of decanedithiol-1,10 in 50 parts of methylene chloride yields tack-free, hard films which are insoluble in methylene chloride after baking for one hour at 100° C. in air.

Example III

Pentaerythritol 7-mercaptoheptanoate is prepared by heating a mixture consisting of 19 parts of 7-mercaptoheptanoic acid, 4.02 parts of pentaerythritol, and one part of xylene at 200° to 220° C. for seven hours, as described in Example II. The product obtained contains 15.5% of thiol sulfur, a total sulfur content of 17.4%, a saponification number of 316.8, and an acid number of 11.1. Films prepared from this product are still tacky after baking for one hour at 100° C. in air in the presence of 0.1% iron, as iron linoleate.

A mixture consisting of 10 parts of the above pentaerythritol 7-mercaptoheptanoate, 200 parts of ethylene glycol maleate, prepared as described in Example II, a film of which remains tacky even after baking in air for one hour at 100° C. and 100 parts of methylene chloride yields films which are hard and tack-free after baking in air for one hour at 100° C.

Example IV

A mixed glyceride containing 60% coconut oil acids glyceride and 40% maleic acid glyceride is prepared by heating a mixture of 326 parts of coconut oil and 92 parts of glycerol at 235° C. for one hour in the presence of 0.15 part of sodium hydroxide, lowering the temperature to 180° C., and then adding 147 parts of maleic anhydride. To the reaction mixture is added 15 parts of xylene and the temperature raised to 200° C. where it is held for 2.5 hours, the water formed being continuously removed. The resinous product has an acid number of 23 and, as a 50% solution xylene, a color index of 2.5 and a viscosity of 1.4 poises. Films of the product remain tacky even after baking in air for two hours at 100° C.

The addition of 5% by weight, based on total solids, of 1,10-decanedithiol to the above product has a remarkable accelerating effect on its drying properties, as evidenced by the fact that films of the mixture are completely tack-free after baking in air for two hours at 100° C. The rate of drying is further improved by addition to the mixture of 0.04% of iron, as iron linoleate.

A mixture of five parts of pentaerythritol 7-mercaptoheptanoate, prepared as described in Example III with ten parts of the above coconut oil-maleic glyceride composition yields films which are tack-free after baking in air for two hours at 100° C. The rate of drying of the films is also improved by addition of 0.01% of iron, as iron linoleate.

*Example V*

In the reactor described in Example II there is placed 148 parts of phthalic anhydride, 100 parts of glycerol, and 10 parts of xylene and the mixture held at 150° to 178° C. for 1.5 hours. To this mixture is added 86 parts of methacrylic acid over a period of one hour, the temperature being maintained during this time at approximately 185° C., and the heating is continued at 180° to 185° C. for about 1.5 hours longer. The product is cooled and reduced with a mixture of 200 parts of butyl acetate and 100 parts of cyclohexanone and the solution filtered through felt while it is still warm. The acid number of the resulting product is 119, its color index is less than 1, and its viscosity about 0.65 poise. Films of this product are still tacky, even after overnight drying in air at room temperature.

The addition of ten parts of 1,10-decanedithiol to 200 parts of the glyceride prepared as described above markedly improves its drying properties, as evidenced by the fact that films prepared from the mixture are tack-free after overnight drying in air at room temperature.

*Example VI*

A polymer corresponding in composition to 30% butadiene and 70% methyl methacrylate is prepared by heating for 25 hours at 45° C., in a closed container, a mixture of 24 parts of butadiene with 56 parts of methyl methacrylate, in the presence of 0.8 part of ammonium persulfate, 0.8 part of sodium hydroxide, and 3.2 parts of oleic acid in 100 parts of water. After addition of 2% of a 50% aqueous dispersion of a mixture of 55 parts of phenyl-alpha-naphthylamine and 45 parts of diphenylamine the interpolymer is coagulated by the addition of saturated aqueous sodium chloride. The coagulate is washed on a corrugated mill to remove the sodium chloride and then dried on a heated, smooth roll at 60° C. A 10% xylene solution of the polymer yields films which are rubbery in nature, have poor adhesion characteristics, and are slightly tacky even after overnight drying in air at room temperature. Baking in air at 100° C. for two hours results in the formation of colorless, hard films which print readily and are soluble in xylene. The addition of ten parts of 1,10-decanedithiol to 200 parts of a 10% xylene solution of the above polymer gives films having improved hardness and adhesion on air drying at room temperature. When baked in air, at 100° C. for two hours, the mixture gives films which show better print resistance than the unmodified films and are insoluble in xylene.

As illustrated by the examples, the compositions of the present invention are mixtures of polymeric polyunsaturated compounds with monomeric polythiols. The polyunsaturated compound should be free of groups, other than the unsaturated linkages, reactive with the thiol group, i. e., should have the unsaturated linkages as the only reacting groups.

The polymeric organic solvent soluble component is generally used in amounts in excess of that required for complete reaction with the monomeric component. If desired, however, the polyunsaturated organic solvent soluble component can be used in amount theoretically required to give complete saturation of the double bonds by SH groups or, if it is wished to combine disulfide formation with addition of SH groups to double bonds, then the thiol component is employed in excess of that which will react with the double bonds in the polymer.

The monomeric polythiols and the polymeric polyunsaturated compounds which are operative in the practice of this invention include both aliphatic and aromatic types as well as aralkyl types. The monomeric polythiols may be primary, secondary, or tertiary and may contain unsaturated linkages. Other functional groups, for example ester, ether, amide, etc. may also be present, provided they do not have an interfering effect on the addition of the thiol to the polyunsaturated compound.

Suitable monomeric polythiols in addition to those of the examples include meta-benzenedithiol, bis-(2-mercaptoethyl) sulfide, 1,2-ethanedithiol, 1,3-propanedithiol, 1,8-octanedithiol, 1,6-octanedithiol, 1,6-hexenedithiol, 1,10-octadecanedithiol, paraxylylenedithiol, pentaerythritol tetra-7-mercaptoheptanoate, mercaptoacetic acid triglyceride, etc.

In the practice of this invention any organic polymeric polyunsaturated organic solvent soluble material can be used and examples are the polymers derived from butadiene-1,3, allene, isoprene, vinylcyclohexene, cyclopentadiene, 1,2-bis-(vinyloxy)ethane, divinylformal, divinyl acetal, divinyl sulfide, and the like; unsaturated condensation polymers, such as the polyesters, such as the reaction products of polyhydric alcohols with polycarboxylic acids, polyethers, polysulfides, polyamide-polyesters, polyacetals, etc., prepared from components at least one of which contains an olefine double bond; unsaturated alcohol modified urea-formaldehyde, melamine-formaldehyde, and phenol-formaldehyde polymers; the unsaturated derivatives of such film-forming polymers as starch, polyvinyl alcohol, casein, etc.; partially polymerized drying oils, e. g. heat bodied linseed oil, and heat bodied China-wood oil, etc.; the linear diene polymers obtained by polymerizing diene hydrocarbons alone and in admixture with one another or in admixture with other polymerizable organic compounds. Examples of such dienes are butadiene-1,3, isoprene, dimethyl-2,3-butadiene-1,3 and the like. Examples of unsaturated organic compounds which can be polymerized with the above dienes are styrene, pinene, isobutylene, camphene, monovinyl acetylene, etc., vinyl ethinyl alkyl carbinols, vinyl acetate, vinyl chloride, unsaturated aldehydes, and ketones, such as acrolein, methyl vinyl ketone, etc., acrylic and methacrylic acids and their esters, amides, imides, and nitriles, e. g. butyl acrylate, methyl methacrylate, acrylonitrile, methacrylonitrile, etc., alpha-chloroacrylic acid and its esters, e. g. methyl-alpha-chloroacrylate, octyl alpha-chloroacrylate, etc., furylacrylic acid and its esters, e. g. methyl furylacrylate, etc., esters of 1,4-butenedioic acids, e. g. dimethyl fumarate, etc. In place of the synthetic polymers, there can be used naturally occurring unsaturated polymers, e. g. natural rubber, gutta percha, etc.

The term "polymer" is used in the description and claims to refer to a macromolecular organic compound containing a plurality of recurring units.

The process of this invention is particularly useful in the vulcanization of natural rubber and of synthetic rubbers. This aspect is illustrated by the examples which follow:

Twenty parts each of natural rubber, of a 75/25 butadiene/styrene polymer prepared by procedures similar to those described in U. S. 1,938,730, of an 85/15 butadiene/acrylonitrile polymer prepared by procedures similar to those disclosed in U. S. 1,973,000, and of polyfluoroprene are masticated on a cold mill, such as is used in the compounding of rubber, and when the rubber is in a plastic condition the thiol is added and the mixture worked on the mill until it is thoroughly homogeneous. The resulting product is removed from the mill and the time required at 70° C. for the rubbers to become insoluble in benzene, a solvent for the original rubbers, determined. The results of a series of experiments are summarized below:

| Rubber | Monomeric polythiol | Amount in parts by wt. | Temp., °C. | Time in mins. for insolubilization in benzene |
|---|---|---|---|---|
| 75/25 butadiene/ styrene polymer.[1] | Ethanedithiol | 0.4 | 70 | 6.5 |
| Do | 1,10-decanedithiol. | 0.4 | 70 | 5.5 |
| 85/15 butadiene/ acrylonitrile/ polymer.[2] | Ethanedithiol. | 0.4 | 70 | 4.0 |
| Natural rubber | ...do... | 0.4 | 70 | 5.0 |
| Polyfluoroprene. | ...do... | 0.4 | 70 | 6.5 |

[1] Made by processes analogous to those described in U. S. 1,978,730.
[2] Made by processes analogous to those described in U. S. 1,973,000.

The process of this invention is therefore of use in the vulcanization of rubbers, both natural and synthetic. In addition, the process of this invention may be employed to improve the drying properties of polymeric materials.

Coating compositions obtained by the addition of polythiols to organic polymeric materials containing polyolefinic unsaturation dry without the use of catalysts. In order to accelerate the drying rate, however, some of the materials commonly used as driers in the varnish art can be added as, for example, iron linoleate, iron resinate, etc. The amount of such drier added may vary from 0.001% to 4% on total solids, but in general, an amount of the order of 0.01% is sufficient.

The compositions of the present invention may be compounded with the adjuvant materials usually employed in the coating, impregnating, and molding composition arts. Thus, molding compositions prepared from the products of this invention may include pigments, fillers, etc. To the compositions of this invention may be added synthetic resins, gums, cellulose derivatives and the like, pigments, waxes, etc., and the resulting compositions used as coatings for rigid and semi-rigid base materials, in the impregnation of paper and other bibulous materials, as adhesives, printing ink ingredients, etc.

The above description and examples are intended to be illustrative only. Any modification of or variation therefrom which conforms to the spirit of the invention is intended to be included within the scope of the claims.

What is claimed is:

1. Process which comprises heating a mixture of a monomeric alkane dithiol and cellulose acetate methacrylate in contact with air until the mixture is insoluble in solvents for the untreated cellulose ester.

2. Process which comprises heating a mixture of a monomeric alkane dithiol and a cellulose ester of an unsaturated acid which is, apart from the carboxyl group, hydrocarbon in contact with air until the mixture is insoluble in solvents for the untreated ester.

3. Process which comprises heating a mixture of a monomeric alkane dithiol and a polymeric polyunsaturated ester in contact with air until the mixture is insoluble in solvents for the untreated ester, said ester being an ester of a polyhydric alcohol of the class consisting of glycerol, glycol, and cellulose with an unsaturated acid which is, apart from the carboxyl group, hydrocarbon.

4. Process which comprises heating a mixture of a monomeric acyclic hydrocarbon polythiol and a polymeric polyunsaturated ester in contact with air until the mixture is insoluble in solvents for the untreated ester, said ester being an ester of a polyhydric alcohol of the class consisting of glycerol, glycol, and cellulose with an unsaturated acid which is, apart from the carboxyl group, hydrocarbon.

5. Process which comprises heating a mixture of a monomeric hydrocarbon polythiol and a polymeric polyunsaturated ester in contact with air until the mixture is insoluble in solvents for the untreated ester, said ester being an ester of a polyhydric alcohol of the class consisting of glycerol, glycol, and cellulose with an unsaturated acid which is, apart from the carboxyl group, hydrocarbon.

6. A composition capable of being rendered insoluble in organic solvents on heating in an oxygen containing atmosphere comprising a monomeric hydrocarbon polythiol and a polymeric polyhydric alcohol ester of the class consisting of glycerol, glycol, and cellulose esters of unsaturated acids which acids are, apart from the carboxyl group, hydrocarbon.

7. A composition capable of being rendered insoluble in organic solvents on heating in an oxygen containing atmosphere comprising a monomeric acyclic hydrocarbon polythiol and a polymeric polyhydric alcohol ester of the class consisting of glycerol, glycol, and cellulose esters of unsaturated acids which acids are, apart from the carboxyl group, hydrocarbon.

8. A composition capable of being rendered insoluble in organic solvents on heating in an oxygen containing atmosphere comprising a monomeric alkane dithiol and a polymeric polyhydric alcohol ester of the class consisting of glycerol, glycol, and cellulose esters of unsaturated acids which acids are, apart from the carboxyl group, hydrocarbon.

9. A composition capable of being rendered insoluble in organic solvents on heating in an oxygen containing atmosphere comprising a monomeric alkane dithiol and a cellulose ester of an unsaturated acid which acid is, apart from the carboxyl group, hydrocarbon.

10. A composition capable of being rendered insoluble in organic solvents on heating in an oxygen containing atmosphere comprising a monomeric alkane dithiol and cellulose acetate methacrylate.

11. The polymeric addition product of cellulose acetate methacrylate and a monomeric alkane dithiol.

12. The polymeric addition product of a cellulose ester of an unsaturated acid which is, apart from the carboxyl group, hydrocarbon and a monomeric alkane dithiol.

13. The polymeric addition product of a cellulose ester of an unsaturated acid which is, apart from the carboxyl group, hydrocarbon and a monomeric acyclic hydrocarbon polythiol.

14. The polymeric addition product of a cellulose ester of an unsaturated acid which is, apart from the carboxyl group, hydrocarbon and a monomeric hydrocarbon polythiol.

15. The polymeric addition product of a monomeric hydrocarbon polythiol and a polymeric polyunsaturated ester of a polyhydric alcohol with an unsaturated acid which is, apart from the carboxyl group, hydrocarbon.

WILLIAM JAMES BURKE.

Certificate of Correction

WILLIAM JAMES BURKE

It is hereby certified that errors appear in the patent issued to the above named inventor on December 3, 1946, requiring correction as follows: In the grant, upper right hand corner, for the patent number "2412954" read *2411954*; in the printed specification, column 6, line 21, claim 2, after the word "which" insert *acid;* and that the said Letters Patent should be read with these corrections therein that the same may conform to the record of the case in the Patent Office.

Signed and sealed this 8th day of April, A. D. 1947.

[SEAL]

LESLIE FRAZER,
*First Assistant Commissioner of Patents.*

9. A composition capable of being rendered insoluble in organic solvents on heating in an oxygen containing atmosphere comprising a monomeric alkane dithiol and a cellulose ester of an unsaturated acid which acid is, apart from the carboxyl group, hydrocarbon.

10. A composition capable of being rendered insoluble in organic solvents on heating in an oxygen containing atmosphere comprising a monomeric alkane dithiol and cellulose acetate methacrylate.

11. The polymeric addition product of cellulose acetate methacrylate and a monomeric alkane dithiol.

12. The polymeric addition product of a cellulose ester of an unsaturated acid which is, apart from the carboxyl group, hydrocarbon and a monomeric alkane dithiol.

13. The polymeric addition product of a cellulose ester of an unsaturated acid which is, apart from the carboxyl group, hydrocarbon and a monomeric acyclic hydrocarbon polythiol.

14. The polymeric addition product of a cellulose ester of an unsaturated acid which is, apart from the carboxyl group, hydrocarbon and a monomeric hydrocarbon polythiol.

15. The polymeric addition product of a monomeric hydrocarbon polythiol and a polymeric polyunsaturated ester of a polyhydric alcohol with an unsaturated acid which is, apart from the carboxyl group, hydrocarbon.

WILLIAM JAMES BURKE.

Certificate of Correction

WILLIAM JAMES BURKE

It is hereby certified that errors appear in the patent issued to the above named inventor on December 3, 1946, requiring correction as follows: In the grant, upper right hand corner, for the patent number "2412954" read *2411954*; in the printed specification, column 6, line 21, claim 2, after the word "which" insert *acid;* and that the said Letters Patent should be read with these corrections therein that the same may conform to the record of the case in the Patent Office.

Signed and sealed this 8th day of April, A. D. 1947.

[SEAL]

LESLIE FRAZER,
*First Assistant Commissioner of Patents.*